(12) United States Patent
Sakurada et al.

(10) Patent No.: US 6,619,966 B2
(45) Date of Patent: *Sep. 16, 2003

(54) CARD-SHAPED ELECTRONIC APPARATUS

(75) Inventors: Noriaki Sakurada, Suwa (JP); Atsushi Shinozaki, Suwa (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,007

(22) PCT Filed: Jun. 4, 1997

(86) PCT No.: PCT/JP97/01890

§ 371 (c)(1),
(2), (4) Date: Apr. 30, 1998

(87) PCT Pub. No.: WO97/47479

PCT Pub. Date: Dec. 18, 1997

(65) Prior Publication Data

US 2002/0001982 A1 Jan. 3, 2002

(30) Foreign Application Priority Data

Jun. 14, 1996 (JP) .............................. 8-154683

(51) Int. Cl.⁷ ................................. H01R 12/00
(52) U.S. Cl. .................. 439/76.1; 361/816
(58) Field of Search .................. 439/638, 76.1, 439/607, 946; 361/816, 737, 747, 748, 770, 787, 807

(56) References Cited

U.S. PATENT DOCUMENTS

| | | | | |
|---|---|---|---|---|
| 4,872,091 A | * | 10/1989 | Maniwa et al. ............. 361/424 |
| 4,975,805 A | * | 12/1990 | Schmutzler ................. 361/399 |
| 5,108,294 A | * | 4/1992 | Marsh et al. ............... 439/76.1 |
| 5,173,841 A | * | 12/1992 | Uenaka et al. ........... 439/946 X |
| 5,189,638 A | * | 2/1993 | Kimura .................. 439/946 X |
| 5,335,145 A | * | 8/1994 | Kusui ........................ 361/737 |
| 5,391,083 A | * | 2/1995 | Roebuck et al. ............... 439/76 |
| 5,510,959 A | * | 4/1996 | Derstine et al. ............. 361/816 |
| 5,566,055 A | * | 10/1996 | Salvi, Jr. .................... 361/816 |
| 5,617,297 A | * | 4/1997 | Lo et al. ................. 361/816 X |
| 5,671,123 A | * | 9/1997 | Omori et al. ........... 361/816 X |
| 5,912,806 A | * | 6/1999 | Onoda et al. ........... 439/946 X |

FOREIGN PATENT DOCUMENTS

| | | |
|---|---|---|
| JP | A-3-199095 | 8/1991 |
| JP | A-281296 | 12/1991 |
| JP | A-4-57281 | 2/1992 |
| JP | A-5-48057 | 6/1993 |
| JP | A-5-318976 | 12/1993 |

* cited by examiner

Primary Examiner—Lynn Feild
Assistant Examiner—Son V. Nguyen
(74) Attorney, Agent, or Firm—Oliff & Berridge, PLC

(57) ABSTRACT

A PC card has a plastic frame provided along the periphery of a substrate. Metal plates, such as stainless steel plates and the like, cover both surfaces of the substrate and are attached to the plastic frame. External surfaces of the metal plates located in an area on the opposite side of a connector and which are touched by a person's hand are covered by an insulation tape, so that, even if a person charged with static electricity touches the PC card when the PC card is inserted or withdrawn from an external apparatus such as a personal computer (PC), the static electricity (charge) of the person does not flow into the external apparatus. Thus, malfunctions or erroneous operations of the external apparatus do not occur.

8 Claims, 6 Drawing Sheets

CARD-SHAPED ELECTRONIC APPARATUS

BACKGROUND OF THE INVENTION

1. Field of Invention

The invention relates to card-shaped electronic apparatuses, and more particularly, to contact type card-shaped electronic apparatuses that use a metal plate as its outer casing, including PC cards, such, as for example, IC memory cards, I/O cards and the like.

2. Description of Related Art

In recent years, facsimile modem expansion boards for communicating with an external apparatus such as a personal computer (hereinafter referred to as PC), hard discs for expansion, and the like have been reduced to a card size, and made available as PC cards, in addition to the already existing card-shaped electronic apparatuses, such as, for example, IC memory cards. These card-shaped electronic apparatuses use a metal plate such as a stainless steel plate (hereinafter referred to as SUS) as an outer casing to increase the rigidity of the card-shaped electronic apparatus, to provide electrostatic resistance and to eliminate noise problems. Hereafter, a PC card will be described as an example of a card-shaped electronic apparatus.

FIG. 13 is an exploded view of a conventional PC card, and FIG. 14 is a cross-sectional view thereof. The PC card according to this example is one in which a conventional PC expansion board or an accessory is implemented in a card-shaped apparatus. In the interior thereof, an input/output integrated circuit (hereinafter referred to as an input/output IC) 5, a semiconductor memory 6 and the like are mounted on a substrate 4. The PC card uses metal plates 2 as upper and lower outer casings for the card, as described above, in order to improve its transportability, handling capability and reliability. The metal plates 2 are fixed to a plastic frame 8 by a fixing means such as adhesive. In order to prevent unnecessary radiation, the upper and lower metal plates 2 are further connected to ground line (hereinafter referred to as GND) of the substrate 4 through a conductive spring 3, as shown in FIG. 14. The PC card is equipped with a connector 1 for mounting on a PC apparatus.

Further, in order to facilitate the inserting and withdrawing of the card, there have been cards in which independent slip-stoppers are attached to the metal plates 2, or slip-stopping grooves are provided on the plastic case 8 in the side sections of the card-shaped electronic apparatus.

Some of the conventional PC cards are provided with an electrostatic countermeasure that is effective upon mounting on a PC. On the other hand, some of the cards are not provided with such a countermeasure due to the limitations imposed by factors such as the space and cost of the card, and the structure of a PC, i.e., the PC's receiving apparatus. In particular, even though a conventional electrostatic countermeasure may be provided with a card, the countermeasure in the card alone may not be sufficient, and a PC apparatus may be required to include a countermeasure according to the structure of the electrostatic countermeasure implemented in the card. Also, an electrostatic countermeasure may, in some cases, be implemented in a PC alone. For example, a lid is provided at the PC card insertion opening, and a piece of metal is provided adjacent to the lid so that static electricity is led out to the frame GND of the PC through the piece of metal when the lid is opened and closed. However, although a lid may be provided at a card insertion opening of a relatively large PC, it is difficult to provide such a structure in the latest PCs, such as, for example, notebook type PCs because of their size, depth and thickness.

Furthermore, PC cards are not provided with an electrostatic countermeasure while they are inserted in a PC. As a result, when a person charged with static electricity touches the card that is inserted in the PC, the charge (static electricity) of the person flows through the metal plates, the conductive spring and the GND within the card to the PC apparatus. As a result, this could become one of the situations that triggers malfunctions, such as, for example, erroneous operation and halt of the PC.

SUMMARY OF THE INVENTION

Therefore, it is an object of the present invention to provide a card-shaped electronic apparatus that is electrostatic-resistant and is capable of securely preventing discharge of static electricity by the card alone.

Also, it is an object of the present invention to provide a highly reliable card-shaped electronic apparatus which does not trigger malfunctions, such as, erroneous operation and halt of a PC and other apparatuses when connected thereto.

Furthermore, it is an object of the present invention to realize, in a card-shaped electronic apparatus, a structure which facilitates its operation when the card is inserted for mounting or withdrawn for dismounting.

The invention has been made in order to solve the above-described problems, and its content will be described below.

A card-shaped electronic apparatus in accordance with the invention comprises a substrate on which electronic devices are mounted, a terminal that is disposed on one side of the substrate and that is brought into contact with a data transmission and reception section of an external apparatus main body for electrical connection, a frame that is positioned at the periphery of the substrate, a metal member that is connected to the frame and covers the substrate at least at the side of the terminal to define an outer casing section, and an insulation member that is connected to the frame at an opposite side with respect to the side of the terminal of the frame. By providing such a structure, the outer casing is formed from an insulation member at the location on the opposite side of the location where the terminal is provided, so that an area of the insulation member is held for mounting or removing the card. Accordingly, for example, even when a person charged with static electricity inserts or withdraws the card, the static electricity is not discharged to the apparatus side, and as a result, malfunctions of the apparatus mounted therewith can be prevented. In addition, since the terminal side is covered by the metal member, radiation is restricted to thereby eliminate noise problems.

The metal member covers both sides of the substrate, and further includes a conductor member that electrically connects the metal member and the substrate. In other words, the metal member is connected to GND of the substrate. As a result, problems caused by external noise and the like can be securely prevented.

Furthermore, the insulation member is disposed at least at a location that protrudes from the external apparatus body when mounted on the external apparatus. By this, the area that is covered by the metal member increases. Accordingly, the rigidity of the card is readily maintained, and even when a person charged with static electricity touches the card that is inserted in the external apparatus, the static electricity is not discharged to the external apparatus side since the portion of the outer casing that protrudes from the external apparatus body is in the insulation condition, and therefore malfunctions of the external apparatus are prevented.

Also, the insulation member and the frame may be integrally formed, the metal member and the insulation member may be integrally formed, and the metal member, the insulation member and the frame may be integrally formed. By providing such structures, the number of parts and manufacturing steps can be reduced, and the cost can be reduced.

Also, the insulation member may be formed to be externally protruded and to have a U-shape cross-section. By forming the insulation member in a U-shape, the thickness of the insulation member whose rigidity is lower compared with the metal can be increased to increase the rigidity (strength) of the insulation member. A space for mounting electronic devices such as semiconductor memories and the like can also be provided in an area that is covered by the insulation member of the substrate, and therefore a large substrate can be used. Also, since the thickness becomes greater by forming it in a U-shape, the operability of the card upon its insertion and withdrawal is improved.

Also, a deform prevention section in a protruded shape may be formed in the interior of the insulation member. By providing the deform prevention section, the protruded deform prevention section contacts the substrate or the insulation member on the opposite side so that the insulation member is prevented from being deformed when the card is gripped and held. As a result, the thickness of the insulation member can be reduced. In particular, the deform prevention members formed on the respective insulation members which are disposed on both surfaces of the substrate may be made engageable with each other, so that the insulation members are prevented from being deformed, and mutual positioning thereof is readily performed.

Also, the metal member may be disposed to cover the entire surface of the substrate, and the insulation member may be disposed to cover the external surface of the metal member. The insulation member is disposed to cover the metal member which has a certain rigidity, so that the insulation member can be selected from a wider range of materials. The insulation member that covers the metal member can be formed into a sheet. When the insulation member is formed into a sheet, the insulation member can be substantially readily disposed at the external surface of the metal member.

Preferably, plastic material is used for the insulation member. By using a plastic material, a high insulation function is obtained, a light-weight member can be readily formed in any desired shape, and it can be formed into a sheet.

Also, in any one of the above-described structures, the insulation member is characterized in having a slip-stopper provided therewith. By providing such a structure, the operability of the card upon insertion and extraction of the card to a mounting body is improved.

DETAILED DESCRIPTION OF PREFERRED EMBODIMENTS

Hereafter, embodiments of the invention will be described with reference to the drawings.

A card-shaped electronic apparatus includes any one of contact type card-shaped electronic apparatuses that are operable by electrically connecting to a data transmission/reception section, such as, for example, a connector that is present at the side of an external apparatus.

The description of the invention will be made with reference to what is generally known as a PC card as an example of the card-shaped electronic apparatus. PC cards include I/O cards, such as, for example, fax/modem cards for communication with apparatuses external to the PCs, card-shaped hard discs for expansion, in addition to the already existing IC memory cards.

Figure 1:
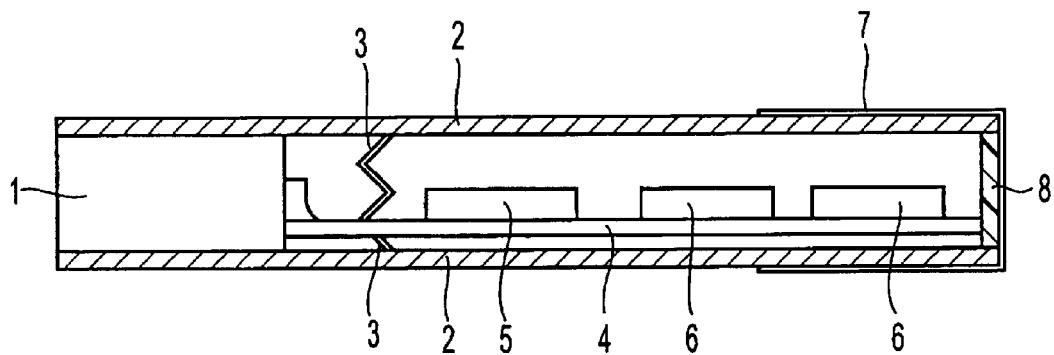
FIG. 1 shows a cross-sectional view of a first embodiment of the invention.

FIG. 1 is a figure illustrating the insulation structure in accordance with a first embodiment of the invention, and shows a cross-sectional view of a PC card. The PC card is formed from a housing structure. In FIG. 1, reference numeral 1 denotes a connector. The connector 1 is provided with a plurality of terminals that are brought into contact with and connected with a connector provided at an external apparatus equipped with a card drive, wherein the connector serves as a data transmission/reception section of the external apparatus. The external apparatus is, for example, a personal computer (PC) which can receive the PC card. Reference numeral 2 denotes a metal plate having certain conductivity, and defining an outer casing. The metal plate 2 can be made of a material such as SUS. Reference numeral 4 denotes a substrate having wiring provided thereon. Electronic devices, such as input/output IC5, semiconductor memory 6 and the like are mounted on the substrate to form circuits thereon. Reference numeral 3 denotes a conductive member that electrically connects the metal plate 2 and the substrate 4, and a spring is used therefor in this embodiment. Alternatively, a connector or the like may be used as long as they are electrically connectable and conductive. The spring is connected to GND of the substrate, for electrically connecting the metal plate so that it conducts with the substrate. Reference numeral 8 denotes a plastic frame, which covers a portion of or the entirety of the side surface of the substrate (a side surface on which electronic devices are not mounted), and defines an outer casing for the side surface of the PC card. Reference numeral 7 denotes an electrically insulative material, such as, for example, an insulation sheet. Here, a tape-shaped member having an adhesive layer on one surface thereof is used therefor.

Figure 13:
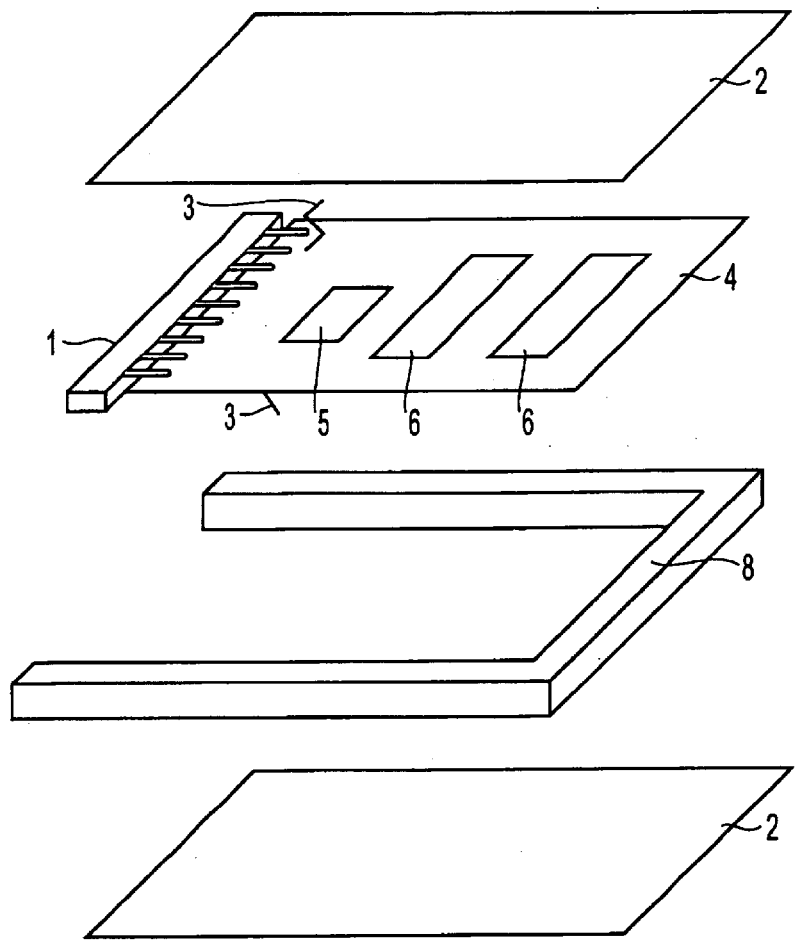
FIG. 13 shows an exploded view of a conventional PC card.
Figure 14:
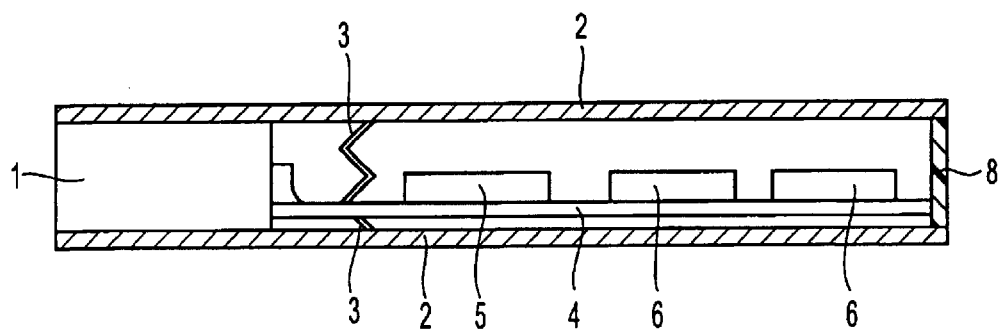
FIG. 14 shows a cross-sectional view of a conventional PC card.

In the PC card as shown in FIG. 13, the substrate 4, on which the input/output IC 5, the semiconductor memory 6, the connector 1 and the conductive spring 3 are mounted, is disposed on the plastic frame 8. The metal plates 2, such as SUS plates, are fixed with adhesive to both upper and lower sides of the plastic frame 8. The metal plates and the plastic frame 8 are formed into an integral structure by applying heat and pressure. Here, one end of the spring 3 is connected to a GND pattern formed on the substrate 4 with solder or by means of pressure-coupling by using the spring feature thereof. The other end of the spring 3 is connected to the metal plate by means of pressure-coupling. Since the substrate 4 and the metal plate 2 are electrically conductive due to the spring 3, when a person charged with static electricity touches the card, the charge (static electricity) charged in the person flows to the metal plate 2, then from the metal plate 2 through the spring 3 to the GND line of the substrate 4. Further, it flows from the GND line through the connector of the PC to the PC main body. As a result, malfunctions of the PC, such as, for example, halt and erroneous operations of the PC occur.

Therefore, a portion of the metal plate 2 where the person touches is covered by an insulation member, such as, the insulation tape 7 to prevent the electrostatic charge from flowing to the metal plate 2, and thus, the flow thereof to the PC apparatus body is prevented. Preferably, in accordance with the embodiment, a portion of the metal plate 2 that protrudes from the PC apparatus body when the PC card is mounted on the PC apparatus body is covered by the insulation tape 7. It is noted that the insulation material is preferably in the shape of a tape so that the provision thereof is easy and the thinness of the card can be maintained to some degree. For the insulation member, any materials, such as, for example, vinyl chloride and the like, may be used as long as they can be used as the insulation tape 7. Also, the insulation tape 7 may be provided with a function of slip-stopper. Namely, a member having a certain degree of surface roughness may be used for the tape.

When the center line of the card in the right-to-left direction (the length direction) of FIG. 1 is assumed to be a border of regions, it is noted that the insulation tape 7 may cover more than half of the region measured from the end side of the card, which is on the opposite side of the connector 1. In particular, in the case of an ordinary PC card which is about 86 mm in dimension in the length direction of the card, about one third of the region on the opposite side of the connector 1 measured from the end side toward the center of the card is preferably covered by the insulation tape 7.

Figure 2:
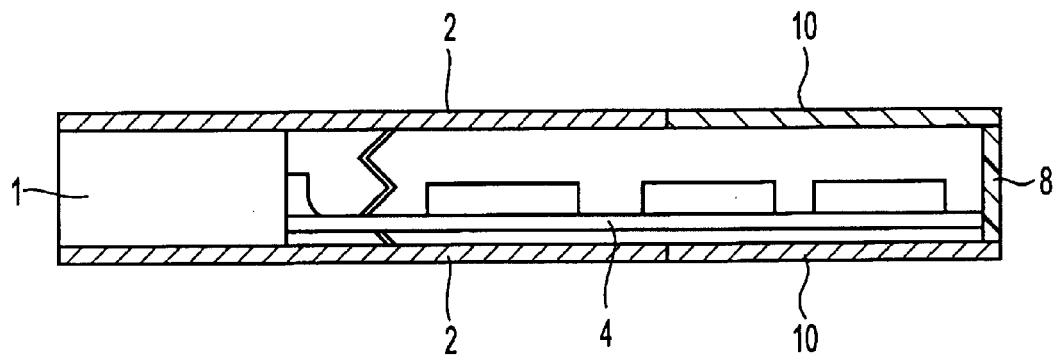
FIG. 2 shows a cross-sectional view of a second embodiment of the invention.

FIG. 2 shows a cross-sectional view of a second embodiment of the invention. In FIG. 2, both sides of the substrate 4 on the connector side are covered by metal plates 2. Both sides of the substrate 4 on the opposite side of the connector side 1 are covered by plastic plates 10 which are insulation members that define outer casings. The plastic plates 10 are formed independently of the plastic frame 8, and are fixed to the frame 8 with adhesive in a similar manner as the metal plates 2. In this case, in a similar manner as in the above-described first embodiment, the plastic plates 10 are provided in at least an area of the PC card which protrudes from the PC apparatus body when the PC card is inserted in the PC apparatus body and, preferably, in an area covering about one third of the length of the PC card. The plastic plates 10 are preferably formed from a polyamide resin, such as, for example, nylon, polyphenylene sulphide (PPS) resin, acrylonitrile butadiene styrene (ABS) resin and the like. In accordance with the second embodiment, the plastic plates 10 are used as insulation members, and therefore can provide better insulation than provided in the first embodiment. Moreover, the plastic plates 10 are formed independently of the plastic frame 8, and the plastic frame 8 is formed from, for example, PPS. As a result, a high degree of measurement accuracy is achieved, and the flatness and the measurement accuracy of the plastic plates 10 are also improved.

Figure 3:
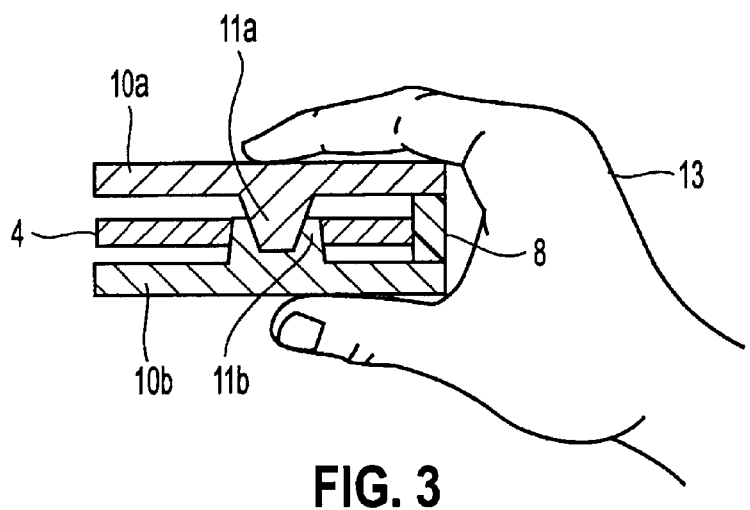
FIG. 3 shows an example of a variation of a plastic plate in accordance with the invention.

FIG. 3 shows an example of a variation of the plastic plates 10. Upper and lower plastic plates 10*a*, 10*b* are provided with protruded deform prevention sections 11*a*, 11*b* formed on internal surfaces of the plates in areas corresponding to locations which are grabbed and held by the hand of a person. Also, the substrate 4 defines a through-hole in an area corresponding to the deform prevention sections 11*a*, 11*b* to allow the deform prevention sections 11*a*, 11*b* to pass therethrough. The deform prevention section 11*a* formed on the upper plastic plate 10*a* is formed, for example, in the shape of a truncated cone. The deform prevention section 11*b* formed on the lower plastic plate 10*b* defines an opening that receives the deform prevention section 11*a*. This structure prevents the plastic plates 10*a*, 10*b* from bending and deforming when the PC card is inserted or withdrawn. Furthermore, since the deform prevention sections 11*a* and 11*b* engage each other, relative positioning of the plastic plates 10*a*, 10*b* is achieved. Also, since the deform prevention section 11*b* passes through the substrate 4, it can be used to position the substrate 4. Alternatively, the upper and lower deform prevention sections 11*a*, 11*b* may be formed so that they face each other, and abut the upper and the lower surfaces of the substrate 4. If the deform prevention sections 11*a*, 11*b* are formed so that they abut the substrate, drilling the hole in the substrate 4 is not required, and thus the number of process steps can be reduced.

Figure 4:
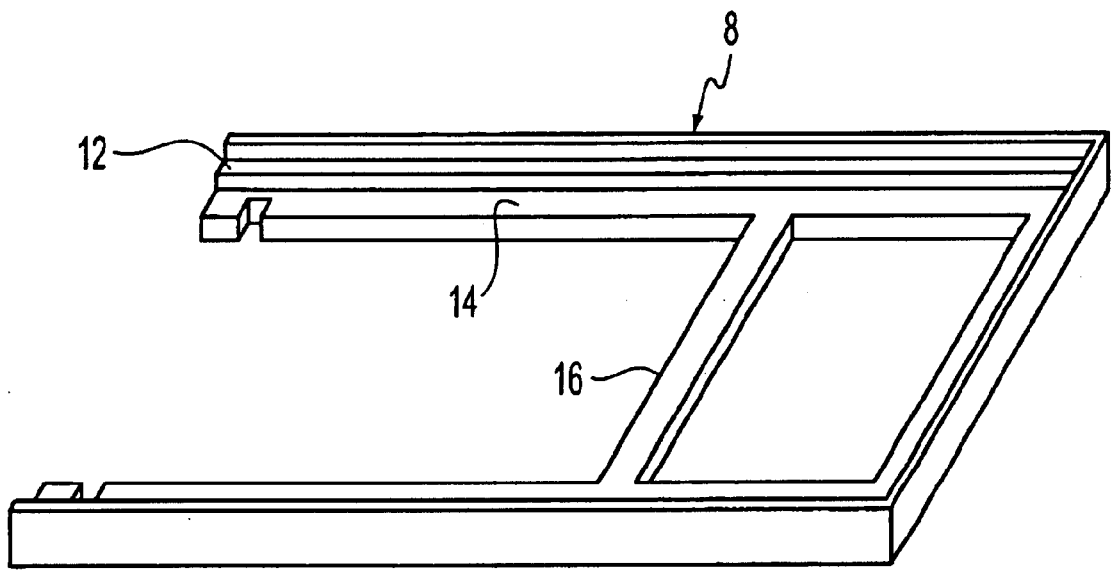
FIG. 4 shows a perspective view of a plastic frame in accordance with another embodiment of the invention.

FIG. 4 shows a plastic frame in accordance with another embodiment of the invention. A plastic frame 8 includes step section 12 formed on an interior edge section thereof in its top-down direction for holding the metal plate 2 and the plastic plates 10a, 10b. Step section 14 is further formed in an area internal to the step section 12 for holding the substrate 4. Also, the plastic frame 8 is integrally provided with a beam 16 extending between the step section 14 in the width direction at a location corresponding to a border section between the metal plates 2 and the plastic plates 10. By this structure, the rigidity of the plastic frame 8 is improved, and the measurement accuracy is improved.

Figure 5:
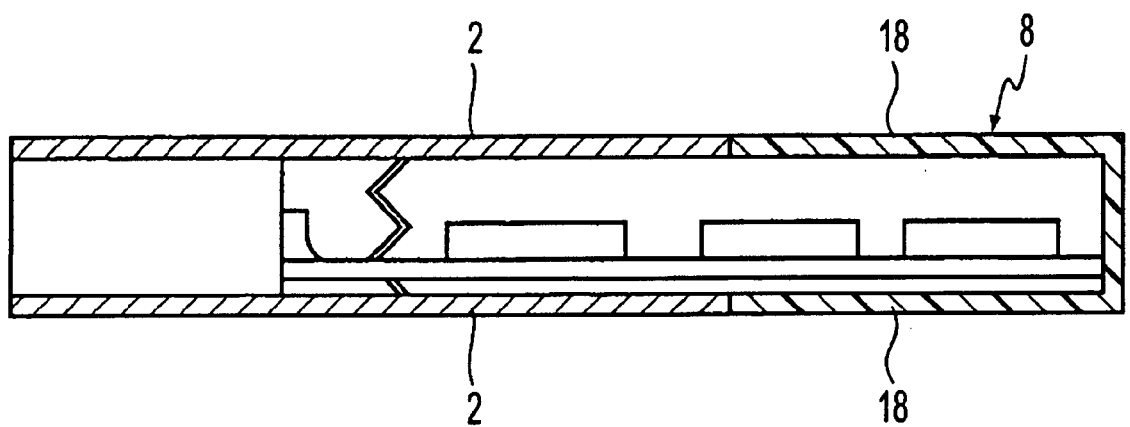
FIG. 5 shows a cross-sectional view of a third embodiment of the invention.

FIG. 5 shows a third embodiment of the invention. In this embodiment, insulation members that define an outer casing and which are positioned at a location on the opposite side of the connector side are integrally formed with the plastic frame 8. More particularly, a PC card shown in FIG. 5 has a structure in which the plastic frame 8 extends to the upper and lower surfaces of the card, namely, to the areas of the outer casing. By forming insulation outer casing sections 18 by the plastic frame 8, the card becomes stronger than the second embodiment, and is also securely insulated. Further the number of parts and assembly steps is reduced and thus the cost is reduced. It is noted that the plastic frame 8 can be further extended so that the plastic material is provided over the upper and lower surfaces of the card to make the entire upper and lower surfaces of the card as an outer casing.

Figure 6:
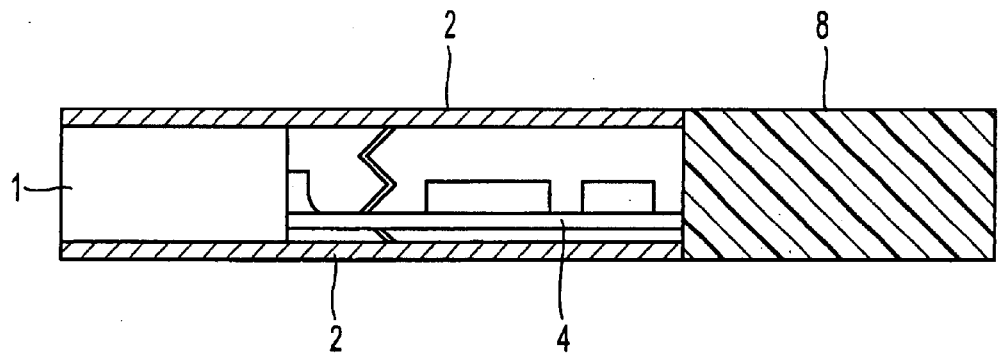
FIG. 6 shows a cross-sectional view of a variation of the third embodiment of the invention.

FIG. 6 shows an example of a variation of the third embodiment. A PC card shown in FIG. 6 has a solid section formed in about one third of the plastic frame 8 on the opposite side of the connector 1. Metal plates 2 are disposed on both sides of the connector 1. The metal plates 2 may be fixed to the plastic frame 8 with adhesive in a similar manner as the other embodiments, pressure-inserted in the plastic frame 8 or fixed by caulking. In this embodiment, since the area of the PC card which is grabbed and held is solid, the card is prevented from being deformed when it is inserted or withdrawn from the PC apparatus body.

Figure 7:
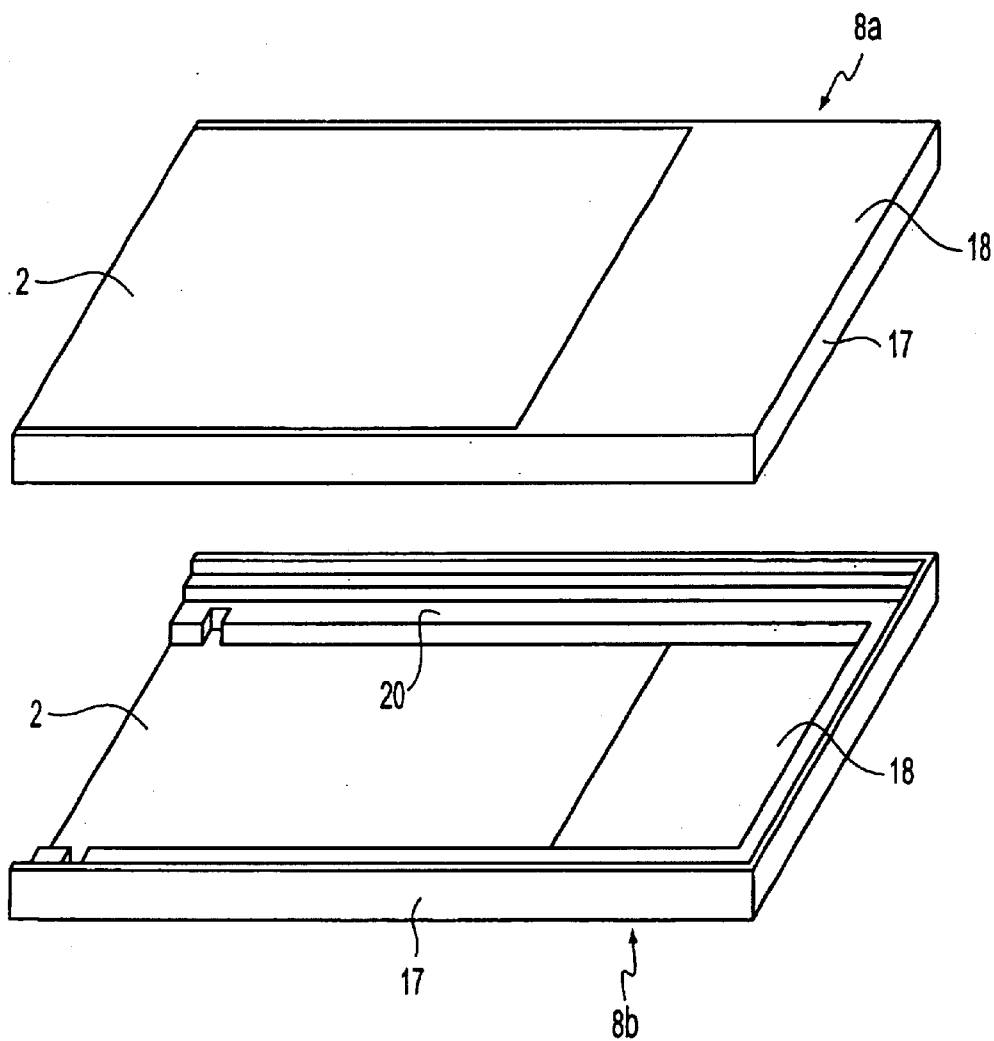
FIG. 7 shows an exploded perspective view of the main portion of a fourth embodiment of the invention.

FIG. 7 shows an exploded perspective view of the main portion of a fourth embodiment of the invention. In this embodiment, a plastic frame 8 is formed from an upper frame member 8a and a lower frame member 8b. Each of the frame members 8a, 8b is integrally formed with an insulative outer casing section 18, and formed in a single piece with a metal plate 2 when each of the frame members 8a, 8b is molded. Further, a step section 20 is provided in the inner periphery of the lower frame member 8b for disposing a substrate. The upper and lower frame members 8a, 8b can be joined by means of adhesive, ultrasound welding and the like. In this embodiment, the frame, metal plates and the insulative outer casing section 18 are formed in a single piece, so that the assembly of the card is readily performed.

Figure 8:
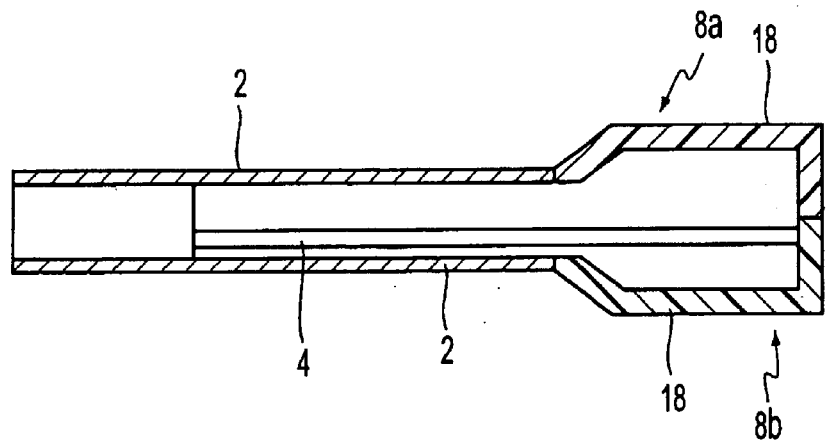
FIG. 8 shows a cross-sectional view of a fifth embodiment of the invention.

In a fifth embodiment of the invention shown in FIG. 8, when frame members 8a, 8b are molded, they are integrally formed with metal plates 2, in a manner similar to the fourth embodiment shown in FIG. 7. In this embodiment, outer casing section 18 externally protrudes and has a U-shape cross-section. By forming the insulative outer casing section 18 in a U-shape cross-section, the plate thickness of the plastic material, which has a smaller rigidity compared with a metal, can be made greater to increase the strength (rigidity) of the insulative outer casing section 18. Accordingly, a space for mounting parts is formed inside the insulative outer casing section 18, and therefore a large substrate 4 can be used.

Figure 9:
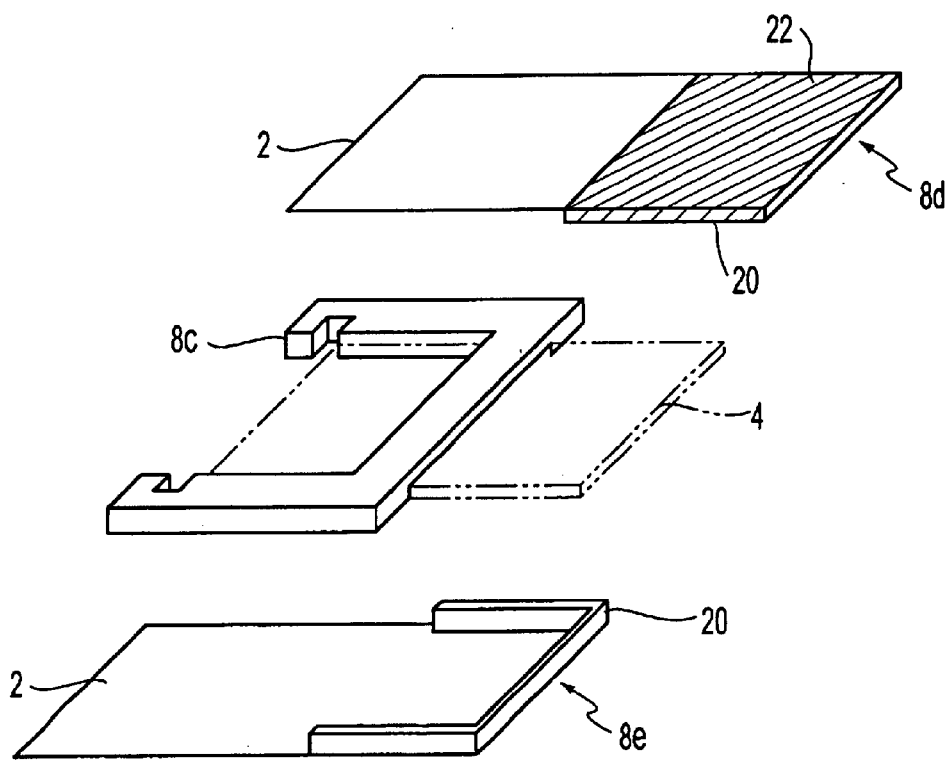
FIG. 9 shows an exploded perspective view of a sixth embodiment of the invention.

FIG. 9 shows an exploded perspective view of a sixth embodiment of the invention. As shown in the figure, a plastic frame section 8 is formed from a frame member 8c on the side of the connector, and upper frame member 8d and lower frame member 8e which define a section on the opposite side of the connector. Each of the upper and lower frame members 8d, 8e, is formed from an integrated piece of a frame section 20, an insulative outer casing section 22 and a metal plate 2. Metal plates 2 are disposed in a manner such that they cover substantially the entire region of the plastic frame section 8. In other words, both the entire surfaces of the substrate 4, and the insulative outer casing section 22 cover a part of the external surfaces of the metal plates 2. In the fifth embodiment, the metal plates 2 are entirely disposed over both of the surfaces of the card, and therefore the strength of the card is increased.

Figure 10:
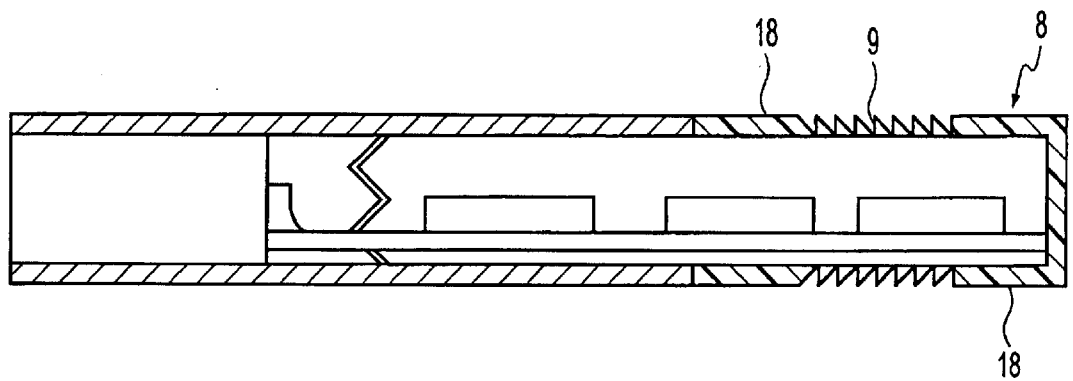
FIG. 10 shows a cross-sectional view of a seventh embodiment of the invention.

FIG. 10 shows a seventh embodiment of the invention.

In FIG. 10, reference numeral 9 denotes a slip-stopper that is provided on a plastic frame 8 which is insulative. Other structures are the same as those described above in each of the embodiments. The slip-stopper 9 is integrally formed in the center of the insulative outer casing section 18 which is integrally formed with the plastic frame 8. Moreover, the slip-stopper 9 is set to a height which is about the same as the height of other areas of the outer casing, and therefore the thickness of the card is maintained unchanged. Because the slip-stopper 9 is provided, for example, the card is readily grasped by the person's fingers when the card is inserted or withdrawn. Accordingly, the operability upon card insertion and withdrawal is improved.

Figure 11:
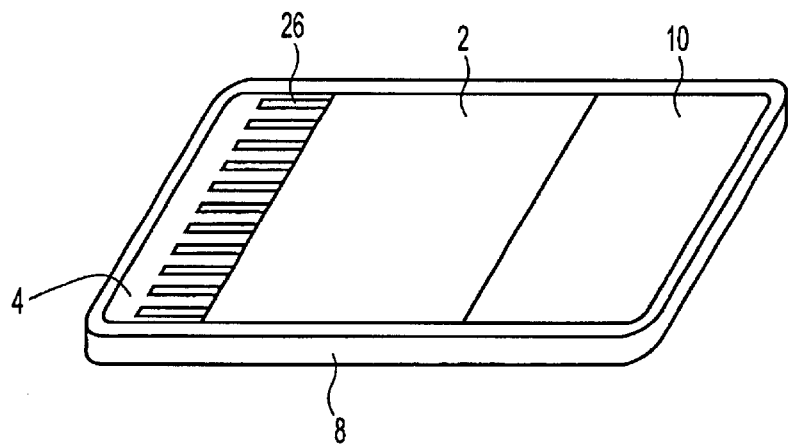
FIG. 11 shows a perspective view of an eighth embodiment of the invention.
Figure 12:
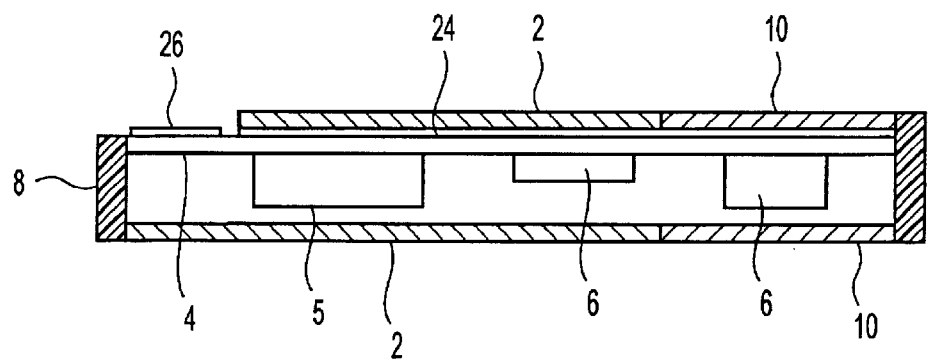
FIG. 12 shows a cross-sectional view of the eighth embodiment of the invention.

FIG. 11 and FIG. 12 respectively show a perspective view and a cross-sectional view of an eighth embodiment of the invention.

A card-shaped electronic apparatus in accordance with this embodiment is a type which does not have a connector. As shown in FIG. 11, a plurality of terminals 26 are formed on the surface of a substrate 4 by means of plating. These terminals 26 are externally exposed so that they can contact with contacts of a connector of an external apparatus, such as a PC, when the side of the terminals is inserted in the connector thereof.

The periphery of the substrate 4 is encircled by a plastic frame 8. Also, as shown in FIG. 12, the card has metal plates 2 disposed over about two thirds of both surfaces of the substrate 4 on the side of the terminals. However, the upper metal plate 2 shown in FIG. 12 is disposed thereover except in an area where the terminals 26 are. The upper metal plate 2 is fixed to the substrate 4 with adhesive 24. Both sides of about one third of each of the terminal side region and the opposite side region of the substrate 4 are covered by plastic plates 10.

In this embodiment, even though portions of the plastic plates 10 are gripped and held, electric charge of a person is prevented from flowing to the apparatus, and malfunctions of the apparatus are prevented.

The card without a connector shown in FIGS. 11 and 12 can be implemented in a variety of embodiments, in a similar manner as the above-described card with a connector.

As described above, card-shaped electronic apparatuses in accordance with the invention are useful for I/O cards, such as, for example, IC memory cards, fax/modem expansion boards, card-shaped hard discs and the like that can be removably mounted on personal computers (PCs).

What is claimed is:

1. A card-shaped electronic apparatus for use with an external apparatus having a data transmission and reception section, comprising:
   - a substrate having electronic devices mounted thereon, a terminal end section and a through-hole;
   - at least one terminal disposed on the terminal end section of the substrate and to contact the data transmission and reception section of said external apparatus to establish electrical connection between card-shaped electronic apparatus and the external apparatus;
   - a frame positioned at the periphery of the substrate;
   - upper and lower metal members respectively connected to top and bottom surfaces of the frame and cover at least apart of the substrate at a side of the terminal end section to define an outer casing section; and
   - upper and lower insulation members each disposed on each side of the substrate, and respectively connected to the upper and lower metal members, and a deform prevention section includes first and second members, each protruding from an inner surface of the upper and lower insulation members, the first member is passable through the through-hole of the substrate to engage the second member.

2. The card-shaped electronic apparatus according to claim 1, wherein the upper and lower insulation members are disposed at a location that protrudes from the external apparatus when mounted on the external apparatus.

3. The card-shaped electronic apparatus according to claim 2, wherein the upper and lower insulation members are formed in a U-shape cross-section.

4. The card-shaped electronic apparatus according to claim 1, wherein the upper and lower insulation members are formed from a synthetic resin material.

5. The card-shaped electronic apparatus according to claim 1, wherein at least one of the upper and lower insulation members is provided with a slip-stopper.

6. The card-shaped electronic apparatus according to claim 1, wherein the first and second members of the deform prevention section abut surfaces of the substrate.

7. A card-shaped electronic apparatus according to claim 1, further comprising a conductor member having two springs, one spring that connects the upper metal member to the substrate and another spring that connects the lower metal member to the substrate.

8. The card shaped electronic apparatus according to claim 1, wherein the upper insulation member and the lower insulation member are jointless.

* * * * *